(12) United States Patent
Kamei et al.

(10) Patent No.: US 12,202,509 B2
(45) Date of Patent: Jan. 21, 2025

(54) DRIVING ASSISTANCE SYSTEM

(71) Applicant: TOYOTA JIDOSHA KABUSHIKI KAISHA, Toyota (JP)

(72) Inventors: Yuhei Kamei, Toyota (JP); Tsutomu Miyazaki, Miyoshi (JP); Hideaki Otsubo, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 18/117,762

(22) Filed: Mar. 6, 2023

(65) Prior Publication Data

US 2023/0373507 A1 Nov. 23, 2023

(30) Foreign Application Priority Data

May 20, 2022 (JP) ................................. 2022-083009

(51) Int. Cl.
*B60W 50/14* (2020.01)
*B60W 10/18* (2012.01)

(52) U.S. Cl.
CPC ............ *B60W 50/14* (2013.01); *B60W 10/18* (2013.01); *B60W 2050/143* (2013.01); *B60W 2050/146* (2013.01); *B60W 2520/10* (2013.01)

(58) Field of Classification Search
CPC .................................................... B60W 50/14
See application file for complete search history.

(56) References Cited

U.S. PATENT DOCUMENTS

| | | | |
|---|---|---|---|
| 6,554,090 B1* | 4/2003 | Kuroda | B60K 31/0008 180/170 |
| 2016/0082961 A1* | 3/2016 | Tashiro | B60T 8/1755 701/93 |
| 2018/0158337 A1* | 6/2018 | Koravadi | G05D 1/0253 |
| 2021/0163043 A1* | 6/2021 | Lee | B60W 10/18 |
| 2021/0268998 A1* | 9/2021 | Brickwedde | G08G 1/166 |
| 2022/0219676 A1* | 7/2022 | Cao | B60W 30/045 |
| 2022/0292749 A1* | 9/2022 | Brooks | G06V 40/18 |
| 2023/0069413 A1* | 3/2023 | Biswas | B60K 35/00 |

FOREIGN PATENT DOCUMENTS

| | | |
|---|---|---|
| JP | 2002-264748 A | 9/2002 |
| JP | 2003-076260 A | 3/2003 |

* cited by examiner

*Primary Examiner* — Travis R Hunnings
(74) *Attorney, Agent, or Firm* — Dinsmore & Shohl LLP

(57) ABSTRACT

On the basis of a target completion position as a position for completing an ON operation of a brake in front of a corner of a predetermined traveling course in a predetermined traveling course, a target completion vehicle speed as a target completion position in the target traveling pattern, a target deceleration as a deceleration at the target completion position in the target traveling pattern, and a vehicle speed of the vehicle, a start timing for starting an ON operation of the brake so that the vehicle speed is reduced to the target completion position at the target deceleration and becomes the target completion vehicle speed at the target completion position is set, and the notification device controls the notification device to perform a brake ON notification which is a notification for prompting the ON operation of the brake at the set start timing.

5 Claims, 3 Drawing Sheets

DRIVING ASSISTANCE SYSTEM

CROSS-REFERENCE TO RELATED APPLICATION

This application claims priority to Japanese Patent Application No. 2022-083009 filed on May 20, 2022, incorporated herein by reference in its entirety.

BACKGROUND

1. Technical Field

The present disclosure relates to a driving assistance system, and more specifically, to a driving assistance system that assists driving of a vehicle.

2. Description of Related Art

Conventionally, as a driving assistance system of this type, a system that assists driving of a vehicle has been proposed (for example, see Japanese Unexamined Patent Application Publication No. 2003-76260 (JP 2003-76260 A)). In this system, a target traveling pattern (data in an ideal traveling line) in a predetermined traveling course, and a vehicle speed (speed) and a brake timing for each predetermined location, which are required when the vehicle travels on the predetermined traveling course, are stored. In a case where the vehicle speed when the vehicle enters a corner exceeds a required entry vehicle speed required when the vehicle enters the corner in the target traveling pattern, a display device displays "BRAKE".

SUMMARY

However, in the above-described driving assistance system, only "BREAK" is displayed on the display device in a case where the vehicle speed when the vehicle enters the corner exceeds the required entry vehicle speed. A driver cannot recognize whether the driver can enter the corner at the same required entry vehicle speed as that of the target traveling pattern at which timing the driver starts an ON operation of a brake while traveling on the predetermined traveling course.

A main object of the driving assistance system according to the present disclosure is to appropriately notify the driver of a start timing at which the ON operation of the brake is started when the vehicle travels on the predetermined traveling course.

The driving assistance system according to the present disclosure adopts the following means in order to achieve the above-described main object.

The driving assistance system according to the present disclosure is a driving assistance system that assists driving of a vehicle traveling on a predetermined traveling course, and includes: a notification device that notifies a vehicle cabin of information; and a control device that sets, based on a target completion position as a position at which an ON operation of a brake is completed preceding a corner of the predetermined traveling course in a target traveling pattern when the vehicle travels on the predetermined traveling course, a target completion vehicle speed as a vehicle speed at the target completion position in the target traveling pattern, target deceleration as deceleration at the target completion position in the target traveling pattern, and a vehicle speed of the vehicle, a start timing for staring the ON operation of the brake such that the vehicle decelerates to the target completion position at the target deceleration and the vehicle speed at the target completion position is the target completion vehicle speed, and that controls the notification device such that the notification device performs a brake ON notification prompting the ON operation of the brake at the start timing that has been set.

The driving assistance system according to the present disclosure includes the notification device that notifies the vehicle cabin of the information. Then, the notification device sets, based on the target completion position as the position at which the ON operation of the brake is completed preceding the corner of the predetermined traveling course in the target traveling pattern when the vehicle travels on the predetermined traveling course, the target completion vehicle speed as the vehicle speed at the target completion position in the target traveling pattern, the target deceleration as the deceleration at the target completion position in the target traveling pattern, and the vehicle speed of the vehicle, the start timing for staring the ON operation of the brake such that the vehicle decelerates to the target completion position at the target deceleration and the vehicle speed at the target completion position is the target completion vehicle speed. At the set start timing, the notification device is controlled so as to perform the brake ON notification that is a notification prompting the ON operation of the brake. Accordingly, it is possible to notify the driver of a timing of the ON operation of the brake in which the vehicle decelerates to the target completion position at the target deceleration and the vehicle speed at the target completion position is the target completion vehicle speed. That is, the driver can be notified of the timing of the ON operation of the brake in which the driver can enter the corner at the same deceleration and vehicle speed as those of the target traveling pattern. As a result, when the vehicle travels on the predetermined traveling course, notification of the start timing at which the ON operation of the brake is started can be appropriately performed. Note that the "target traveling pattern" can include a traveling pattern that is a model by a particular driver (a specific driver) such as a famous formula one (F1) driver and rally driver in the predetermined traveling course.

In the driving assistance system according to the present disclosure, the start timing may be a timing at which an arrival time as a time required for the vehicle to travel from a current position and reach the target completion position while maintaining the vehicle speed becomes a deceleration time as a time required for the vehicle speed to become the target completion vehicle speed when the vehicle decelerates from the current position at the target deceleration. With the above, the notification of the start timing can be appropriately performed.

Further, in the driving assistance system according to the present disclosure, the control device may control the notification device such that the notification device performs a brake preparation notification that is a notification prompting preparation of the ON operation of the brake a predetermined time before the start timing. With the above, the brake preparation notification can be performed at a timing at which the driver of the vehicle can have enough time to prepare the ON operation of the brake.

In this case, the start timing may be a timing at which an arrival time as a time required for the vehicle to travel from a current position and reach the target completion position while maintaining the vehicle speed becomes a deceleration time as a time required for the vehicle speed to become the target completion vehicle speed when the vehicle decelerates from the current position at the target deceleration; and a timing of the predetermined time before the start timing may be a timing at which the arrival time is a time obtained by adding the predetermined time to the deceleration time. With the above, the brake preparation notification and the brake ON notification can be appropriately performed.

In the driving assistance system according to the present disclosure, which performs the brake ON notification and the brake preparation notification, the notification device may include a display device for displaying the information such that the information is visually recognizable, and an audio output device for outputting the information by sound, and the control device may control one of the display device and the audio output device such that the one of the display device and the audio output device performs the brake ON notification, and may control another of the display device and the audio output device such that the other of the display device and the audio output device performs the brake preparation notification. Since the brake ON notification and the brake preparation notification are performed to the driver by different devices, it is possible to suppress the driver from confusing the brake ON notification and the brake preparation notification.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, embodiments for carrying out the present disclosure will be described using examples.

Examples

Figure 1:
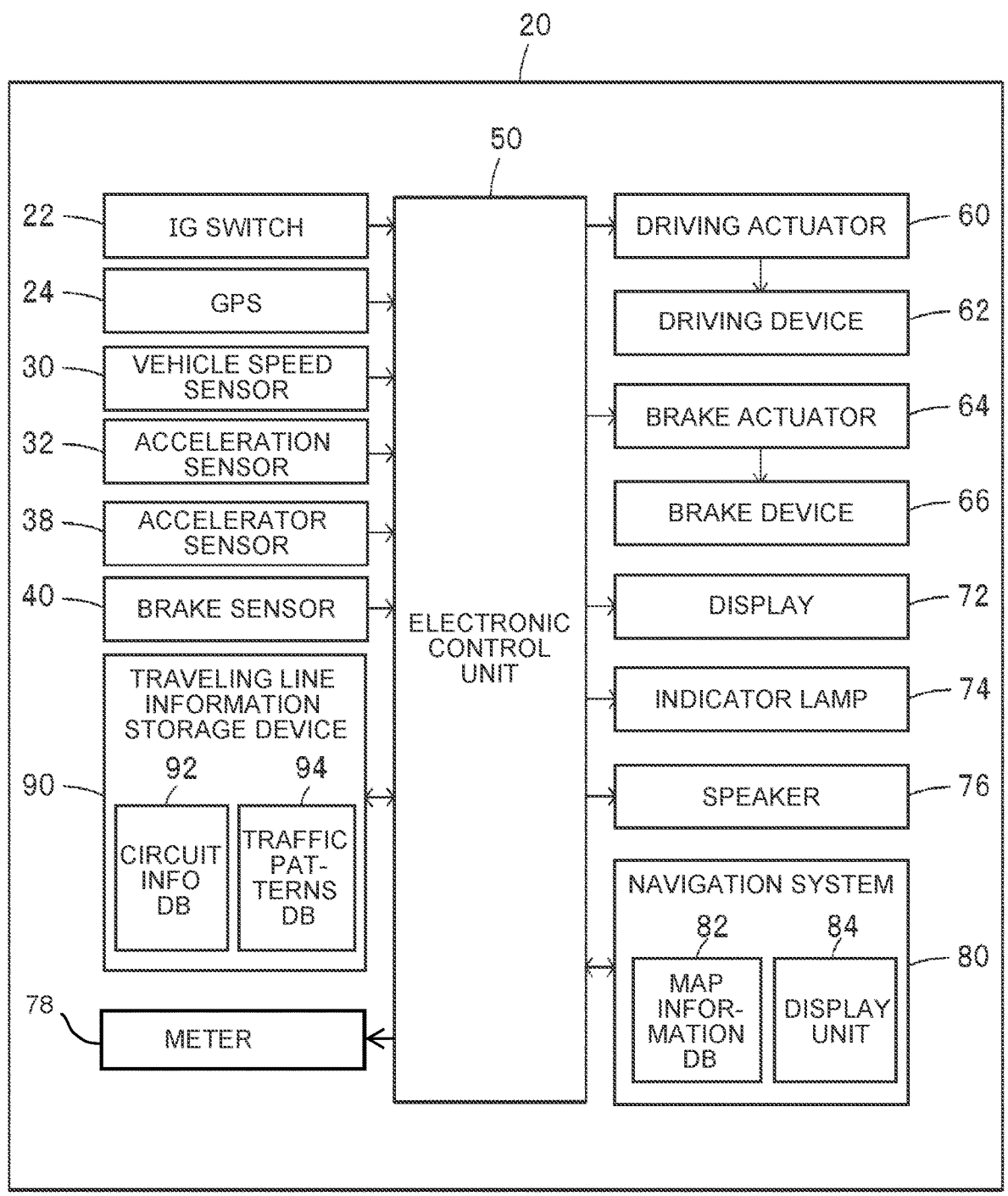
FIG. 1 is a block diagram showing, as a block, an example of a configuration of an automobile 20 in which a driving assistance system as an embodiment of the present disclosure is mounted with an electronic control unit 50 as a center.

FIG. 1 is a block diagram showing, as a block, an example of a configuration of an automobile 20 including an electronic control unit 50 and a driving assistance system as an embodiment of the present disclosure. As illustrated, the automobile 20 of the embodiment is configured as an automobile driven by power from a driving device 62 such as a motor or an engine. In the embodiment, the electronic control unit 50, the indicator lamp 74, the speaker 76, the navigation system 80, and the traveling line information storage device 90 correspond to a "driving assistance system".

In addition to the driving device 62, the automobile 20 of the embodiment includes an ignition switch 22, a Global Positioning System (GPS) 24, a vehicle speed sensor 30, an acceleration sensor 32, an accelerator sensor 38, a brake sensor 40, an electronic control unit 50, a driving actuator 60, a brake actuator 64, a brake device 66, a display 72, an indicator lamp 74, a speaker 76, a meter 78, a navigation system 80, a traveling line information storage device 90, and the like.

GPS 24 is a device that detects the position of vehicles based on signals transmitted from a plurality of GPS satellites. The vehicle speed sensor 30 detects the vehicle speed of the vehicle based on the wheel speed and the like. The acceleration sensor 32 detects, for example, an acceleration in the front-rear direction of the vehicle or an acceleration in the left-right direction (lateral direction) of the vehicle.

The accelerator sensor 38 detects an accelerator operation amount or the like corresponding to the depression amount of the accelerator pedal of the driver. The brake sensor 40 detects a brake position or the like as a depression amount of the brake pedal of the driver.

The driving device 62 includes a driving motor, an engine, and the like, and is driven and controlled by a driving actuator 60.

Although not shown, the electronic control unit 50 is configured as a microcomputer centered on CPU. In addition to CPU, the electronic control unit 50 includes a ROM, a RAM, a flash memory, an input port, an output port, a communication port, and the like. The electronic control unit 50 sets a required torque to be output from the driving device 62 to the drive shaft to which the drive wheels are connected, a required braking force to be output from the brake device 66, and the like on the basis of an accelerator operation amount from the accelerator sensor 38, a brake position from the brake sensor 40, and the like.

The electronic control unit 50 sets a required torque to be output from the driving device 62 to the drive shaft to which the drive wheels are connected, and a required braking force to be output from the brake device 66 based on an accelerator operation amount from the accelerator sensor 38, a brake position from the brake sensor 40, a vehicle speed from the vehicle speed sensor 30, and the like. The electronic control unit 50 transmits the set required torque to the driving actuator 60, and transmits the set required braking force to the brake actuator 64.

The driving actuator 60 drives and controls the driving device 62 so that the required torque set by the electronic control unit 50 is output from the driving device 62 to the drive shaft.

The brake actuator 64 controls the brake device 66 such that the required braking force set by the electronic control unit 50 acts on the vehicle by the brake device 66.

The display 72 is configured as a display device that visually displays various types of information, and is incorporated in a dashboard of a vehicle. The display 72 is controlled by an electronic control unit 50.

The indicator lamp 74 is configured as a Light Emitting Diode (LED) and is incorporated in the dashboard of the vehicle. The indicator lamp 74 is controlled by the electronic control unit 50.

The speaker 76 is configured as an audio output device that outputs various kinds of information output from the electronic control unit 50 as a sound, and is incorporated in a dashboard of the vehicle. The speaker 76 is controlled by an electronic control unit 50.

The navigation system 80 is a system that guides the host vehicle to a set destination, and includes a map information database 82 and a display unit 84. The map information database 82 stores, as map information, the road surface pavement state of the road in each section, the width of the road, the number of lanes, the width of the sidewalk, the direction in which the vehicle can pass, the legal speed, and the like. When the destination is set, the navigation system 80 sets a route based on the destination information, the information on the current location (the current location of the own vehicle) acquired by GPS 24, and the information stored in the map information database 82, and performs route guidance.

The traveling line information storage device 90 is a storage device that stores information necessary for traveling in a predetermined circuit (predetermined traveling course). The traveling line information storage device 90 includes a circuit information database 92 and a travel pattern database 94. The circuit information database 92 stores information (a shape of a course, a state of a traveling road, a width of a traveling road, a position on a map, and the like) on a circuit scattered in each place. The travel pattern database 94 stores model travel patterns that are examples of particular drivers (specific drivers) such as famous F1 drivers and random drivers in the circuit. The model running pattern includes a running line at the time of the fastest lap by the specific driver in each circuit. In addition, the driving pattern includes a braking completion position Pbf as a position where the on operation is completed after the on operation of the braking is started by full braking in front of the corner in order to enter the corner. In addition, the example travel pattern includes a braking completion vehicle speed Vbf as a vehicle speed at the braking completion position Pbf, a deceleration G from when the ON operation of the brake is started to when the braking reaches the braking completion position Pbf, a shift change point, and the like.

Figure 2:
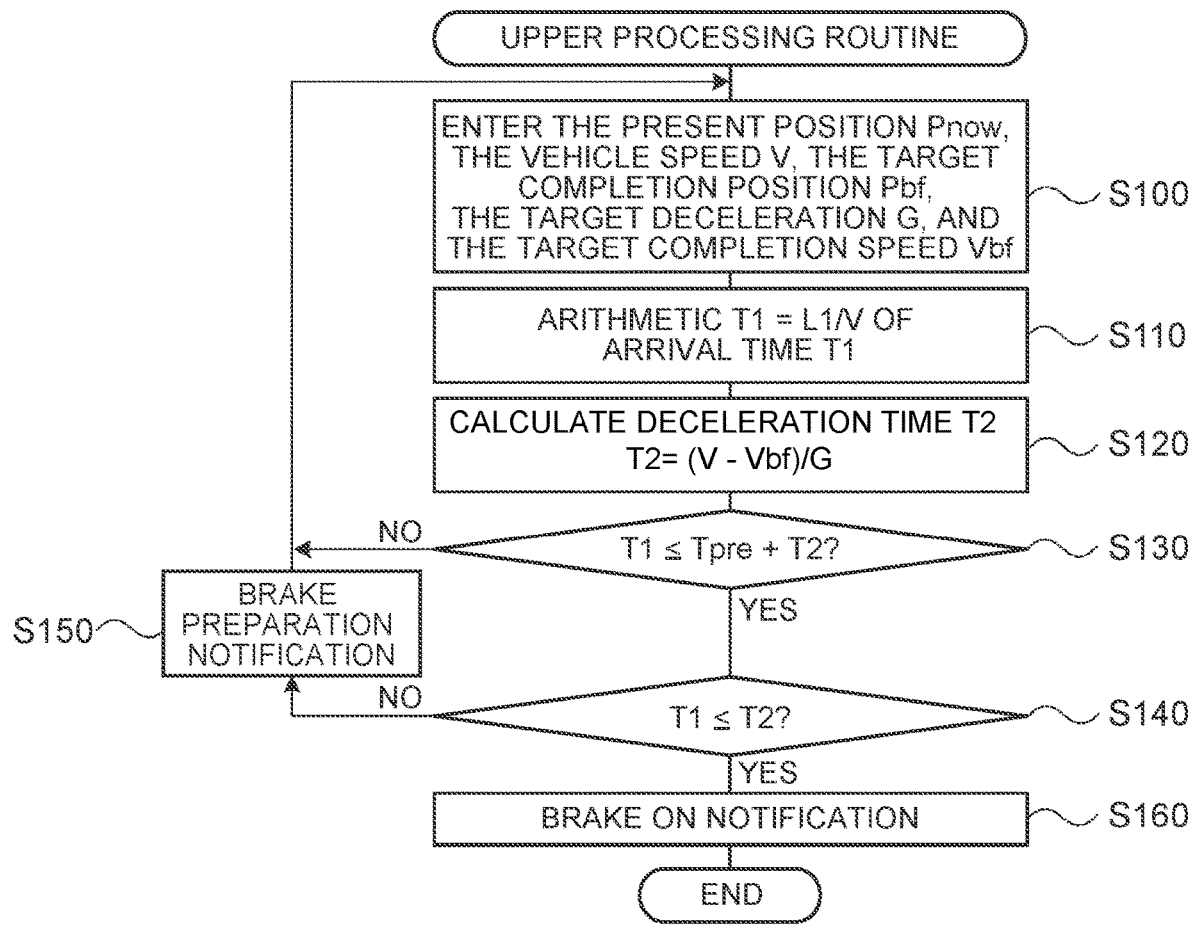
FIG. 2 is a flowchart illustrating an example of a notification processing routine executed by the electronic control unit 50.

Next, the operation of the automobile 20 configured in this way, in particular, the operation when notifying the driver of the start of the brake on operation will be described. FIG. 2 is a flowchart illustrating an example of a notification processing routine executed by the electronic control unit 50. This notification process is executed when the electronic control unit 50 determines that the automobile 20 is traveling in the circuit and is located in a predetermined Dref (e.g., 50 m, 60 m, 70 m) in front of the corner based on the information of the present position acquired by GPS 24.

When this routine is executed, CPU (not shown) of the electronic control unit 50 executes a process of inputting the present position Pnow, the vehicle speed V, the target completion position Pbf, the target deceleration G, and the target completion vehicle speed Vbf of the host vehicle (step S100). As the current position Pnow, information of the current position (the position of the current own vehicle) acquired by GPS 24 is inputted. A value detected by the vehicle speed sensor 30 is input as the vehicle speed V. The braking completion position Pbf, the deceleration G, and the braking completion vehicle speed Vbf of the exemplar travel pattern included in the travel pattern database 94 are inputted as the target completion position Pbf, the target deceleration G, and the target completion vehicle speed Vbf, respectively.

Next, CPU calculates the arrival-time T1 using the travel distance L1 from the present position Pnow to the target completion position Pbf and the vehicle speed V using the following Expression (1) (step S110). The arrival time T1 is a time required to reach from the current position Pnow to the target completion position Pbf when the vehicle travels while maintaining the vehicle speed V from the current position Pnow to the target completion position Pbf. The travel distance L1 is calculated from the shapes of the courses in the circuit information database 92, the present position Pnow, and the target completion position Pbf.

$$T1 = L1/V \tag{1}$$

Then, CPU uses the vehicle speed V, the target completion vehicle speed Vbf, and the target deceleration G to calculate the deceleration time T2 by the following equation (2) (step S120). The deceleration time T2 is a time required for the vehicle speed V to become the target completion vehicle speed Vbf when deceleration is performed at the target deceleration G from the present position Pnow.

$$T2 = (V - Vbf)/G \tag{2}$$

When the arrival time T1 and the deceleration time T2 are calculated, CPU determines whether or not the arrival time T1 is equal to or less than the time obtained by adding the preparation time (predetermined time) Tpre to the deceleration time T2 (step S130) and whether or not the arrival time T1 is equal to or less than the deceleration time T2 (step S140). The preparation time Tpre is sufficient time (e.g., 2 seconds, 3 seconds, 4 seconds, etc.) to prepare for the brake on operation, such as the driver placing one foot on the brake pedal prior to starting the brake on operation. The preparation-time Tpre is determined in advance by experimentation, analysis, and machine learning.

Figure 3:
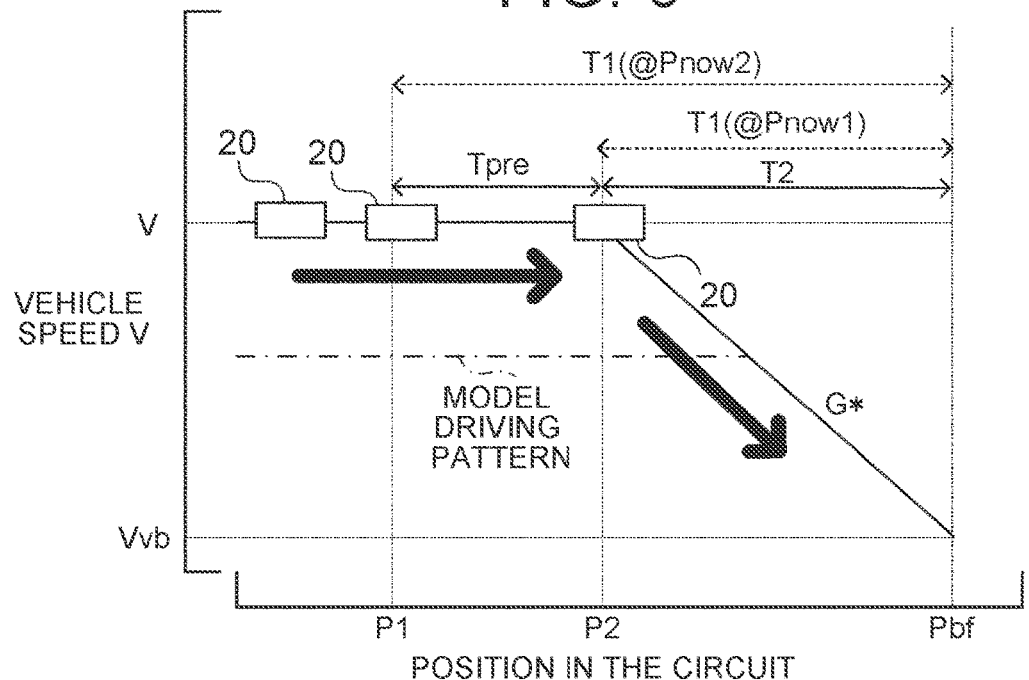
FIG. 3 is an explanatory diagram for explaining an exemplary relation between the position of the automobile 20 in the circuit, the vehicle speed, the arrival time T1, the deceleration time T2, and the preparation time Tpre when the automobile 20 is traveling at the vehicle speed V.

FIG. 3 is an explanatory diagram for explaining an exemplary relation between the position of the automobile 20 in the circuit, the vehicle speed, the arrival time T1, the deceleration time T2, and the preparation time Tpre when the automobile 20 is traveling at the vehicle speed V. In FIG. 3, a thick line arrow indicates a traveling direction of the automobile 20. The square mark indicates the position of the automobile 20. The dashed-dotted line indicates the relationship between the position in the circuit and the vehicle speed V in the model driving pattern. As shown in FIG. 3, a position where the arrival time T1 is the same as the time obtained by adding the preparation time Tpre to the deceleration time T2 is the position P1, and a position where the arrival time T1 is the same as the deceleration time T2 is the position P2. When the arrival time T1 is longer than the time of adding the preparation time Tpre to the deceleration time T2, the automobile 20 is located farther from the corner than the position P1. When the arrival time T1 is less than or equal to the time obtained by adding the preparation time Tpre to the deceleration time T2 and is longer than the deceleration time T2, the automobile 20 is located between the position P1 and the position P2. When the arrival time T1 is less than or equal to the deceleration time T2, the automobile 20 is located at a corner of the position P2 or the position P2. In this way, the position of the automobile 20 can be determined by comparing the arrival time T1 with the deceleration time T2 plus the preparation time Tpre and the deceleration time T2.

In S130 of steps, when the arrival time T1 is longer than the time obtained by adding the preparation time Tpre to the deceleration time T2, CPU determines that the automobile 20 is traveling before the position P1. The process returns to step S100 and the steps S100 to S130 are repeated until the arrival time T1 is less than or equal to the deceleration time T2 plus the reserve time Tpre.

At step S130, when the arrival time T1 is equal to or less than the time obtained by adding the preparation time Tpre to the deceleration time T2, and at step S140, when the arrival time T1 exceeds the deceleration time T2, CPU determines that the automobile 20 is traveling between the position P1 or the position P1 and the position P2, and the speaker 76 is controlled so that a sound (brake preparation notification) prompting preparation for the ON operation of the brake is outputted (step S150), the process returns to step S100. Examples of the voice prompting preparation of the brake on operation include "Prepare the brake". Then, the steps S100 to S150 are repeated until the arrival time T1 becomes equal to or less than the deceleration time T2 in the step S140.

In S140 of steps, when the arrival time T1 is less than or equal to the deceleration time T2, CPU determines that the automobile 20 is in the position P2 or passes through the position P2. CPU controls the indicator lamp 74 so that the indicator lamp 74 is turned on as a notification (brake on notification) for prompting the driver to perform the ON operation of the brake (step S160), and ends the routine.

Figure 4:
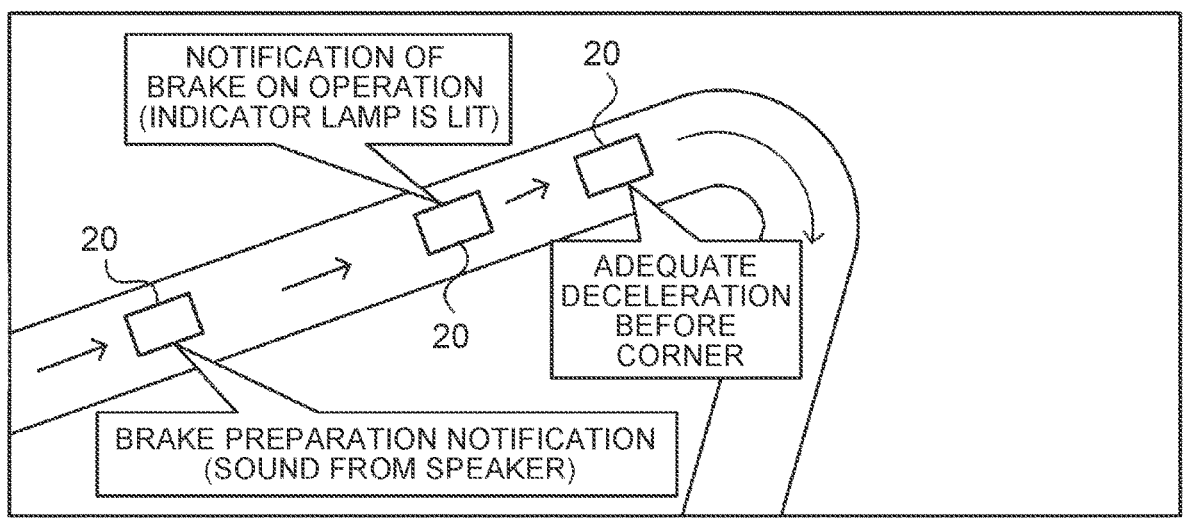
FIG. 4 is an explanatory diagram for explaining an example of a state in which the automobile 20 according to the embodiment enters a corner in a circuit.

FIG. 4 is an explanatory diagram for explaining an example of a state in which the automobile 20 according to the embodiment enters a corner in a circuit. In the drawing, an arrow indicates a traveling direction of the automobile 20. At a timing when the automobile 20 travels toward the corner and the arrival time T1 becomes equal to or less than the time obtained by adding the preparation time Tpre to the deceleration time T2, a sound (brake preparation notification) prompting preparation for the ON operation of the brake is outputted from the speaker 76 (step S130 to S150). With this sound, it is considered that the driver recognizes that the timing is a timing at which the ON operation of the brake is prepared, for example, by placing one foot on the brake pedal, and prepares the ON operation of the brake. When the arrival time T1 becomes equal to or less than the deceleration time T2, the indicator lamp 74 is turned on (step S130, S140, S160). As described above, the deceleration time T2 is a time required for the vehicle speed V to become the target completion vehicle speed Vbf when deceleration is performed at the target deceleration G from the present position Pnow. Therefore, when the braking on operation is started in the position P2 in the same manner as the target traveling pattern in the full braking, the automobile 20 decelerates at the target deceleration G and travels in the traveling pattern in which the vehicle speed V at the target completion position Pbf becomes the target completion vehicle speed Vbf in the same manner as the example traveling pattern. When the automobile 20 is traveling in front of the corner at a vehicle speed different from the model travel pattern, when the automobile 20 starts the ON operation of the brake at the same brake starting position as the model travel pattern, the deceleration to the braking completion position Pbf and the vehicle speed at the braking completion position Pbf deviate from the model travel pattern. Cornering similar to that of the model driving pattern cannot be performed, and the driver's satisfaction may be deteriorated. In the embodiment, when the arrival time T1 becomes equal to or less than the deceleration time T2, since the indicator lamp 74 is turned on, even when the automobile 20 is traveling in front of the corner at a vehicle speed that is different from the model travel pattern, the driver can be notified of the starting timing of the proper turning-on operation of the brake that can enter the corner at the same deceleration and vehicle speed as the target traveling pattern. This makes it possible to appropriately notify the driver of the start timing of the brake ON operation. When the ON operation of the brake is performed by full braking, the driver who visually recognizes the lighting of the indicator lamp 74 can enter the corner at the same deceleration and vehicle speed as the model driving pattern, and can enjoy driving in the circuit. Further, the brake preparation notification is performed by the output of the sound from the speaker 76, and the brake start notification is performed by the lighting of the indicator lamp 74, whereby the driver is prevented from confusing the brake preparation notification and the brake start notification.

According to the automobile 20 equipped with the driving assistance system of the embodiment described above, in the model driving pattern when the circuit is traveling, the arrival time T1 and the deceleration time T2 are calculated on the basis of the target completion position Pbf as the braking completion position Pbf for completing the ON operation of the brake in front of the corner, the target completion vehicle speed Vbf as the braking completion vehicle speed Vbf in the target traveling pattern of the model traveling pattern, the target deceleration G as the deceleration in the target completion position Pbf in the target traveling pattern, and the vehicle speed V of the automobile 20. When the indicator lamp 74 is turned on at a timing when the arrival time T1 reaches the deceleration time T2, the notification of the starting timing at which the ON operation of the brake is started can be appropriately performed.

Further, the arrival time T1, at a timing that the time obtained by adding the preparation time Tpre to the deceleration time T2, by the brake preparation notification is performed, which is a notification prompting the preparation of the ON operation of the brake in the vehicle cabin, the driver of the vehicle can be performed brake preparation notification at a timing that can be performed with a margin to prepare the ON operation of the brake can be performed.

Further, the brake preparation notification is performed by the output of the sound from the speaker 76, and the brake start notification is performed by the lighting of the indicator lamp 74, so that the driver is prevented from confusing the brake preparation notification and the brake start notification.

In the automobile 20 equipped with the driving assistance system of the embodiment, a brake preparation notification, which is a notification prompting the vehicle cabin to prepare the ON operation of the brake, is performed at a timing when the arrival time T1 is a time obtained by adding the preparation time Tpre to the deceleration time T2. However, the automobile 20 may not perform such a brake preparation notification.

The automobile 20 equipped with the driving assistance system of the embodiment issues a brake preparation notification by outputting a sound from the speaker 76, and issues a brake start notification by turning on the indicator lamp 74. However, the automobile 20 may issue a brake preparation notification by turning on the indicator lamp 74, and issue a brake start notification by outputting a sound from the speaker 76. The automobile 20 may perform a brake preparation notification and a brake start notification by turning on the indicator lamp 74. The automobile 20 may perform a brake preparation notification and a brake start notification by outputting sound from the speaker 76. Further, the automobile 20 may display at least one of the brake preparation notification and the brake start notification on the display 72.

The correspondence between the main elements of the embodiment and the main elements of the disclosure described in SUMMARY will be described. In the embodiment, the indicator lamp 74 and the speaker 76 correspond to the "notification device", and the electronic control unit 50, the navigation system 80, and the traveling line information storage device 90 correspond to the "control device".

As for the correspondence between the main elements of the embodiment and the main elements of the disclosure described in SUMMARY, since the embodiment is an example for specifically describing a mode for carrying out the disclosure described in SUMMARY, the embodiment does not limit the elements of the disclosure described in SUMMARY. In other words, the interpretation of the disclosure described in SUMMARY should be performed based on the description in SUMMARY, and the embodiment is merely a specific example of the disclosure described in SUMMARY.

Although a mode for carrying out the present disclosure has been described above with reference to the embodiment, the present disclosure is not limited to the embodiment, and it goes without saying that the present disclosure can be carried out in various modes without departing from the gist of the present disclosure.

The present disclosure is applicable to a manufacturing industry of a driving assistance system and the like.

What is claimed is:

1. A driving assistance system that assists driving of a vehicle traveling on a predetermined traveling course, the driving assistance system comprising:
   a notification device that notifies a vehicle cabin of information; and
   a control device
      that sets, based on a target completion position as a position at which an ON operation of a brake is completed preceding a corner of the predetermined traveling course in a target traveling pattern when the vehicle travels on the predetermined traveling course, a target completion vehicle speed as a vehicle speed at the target completion position in the target traveling pattern, target deceleration as deceleration at the target completion position in the target traveling pattern, and a vehicle speed of the vehicle, a start timing for staring the ON operation of the brake such that the vehicle decelerates to the target completion position at the target deceleration and the vehicle speed at the target completion position is the target completion vehicle speed, and
      that controls the notification device such that the notification device performs a brake ON notification prompting the ON operation of the brake at the start timing that has been set.

2. The driving assistance system according to claim 1, wherein the start timing is a timing at which an arrival time as a time required for the vehicle to travel from a current position and reach the target completion position while maintaining the vehicle speed becomes a deceleration time as a time required for the vehicle speed to become the target completion vehicle speed when the vehicle decelerates from the current position at the target deceleration.

3. The driving assistance system according to claim 1, wherein the control device controls the notification device such that the notification device performs a brake preparation notification that is a notification prompting preparation of the ON operation of the brake a predetermined time before the start timing.

4. The driving assistance system according to claim 3, wherein:
   the start timing is a timing at which an arrival time as a time required for the vehicle to travel from a current position and reach the target completion position while maintaining the vehicle speed becomes a deceleration time as a time required for the vehicle speed to become the target completion vehicle speed when the vehicle decelerates from the current position at the target deceleration; and
   a timing of the predetermined time before the start timing is a timing at which the arrival time is a time obtained by adding the predetermined time to the deceleration time.

5. The driving assistance system according to claim 3, wherein:
   the notification device includes
      a display device for displaying the information such that the information is visually recognizable, and
      an audio output device for outputting the information by sound; and
   the control device
      controls one of the display device and the audio output device such that the one of the display device and the audio output device performs the brake ON notification, and
      controls another of the display device and the audio output device such that the other of the display device and the audio output device performs the brake preparation notification.

* * * * *